United States Patent [19]

Van Dijk

[11] Patent Number: 4,781,910

[45] Date of Patent: Nov. 1, 1988

[54] HYDROGEN SULFIDE REMOVAL AND SULFUR RECOVERY

[75] Inventor: Christiaan P. Van Dijk, Houston, Tex.

[73] Assignee: W. Bruce Smith and Butler & Binion, Houston, Tex.

[21] Appl. No.: 853,277

[22] Filed: Apr. 17, 1986

[51] Int. Cl.$^4$ .................. B01D 53/34; C01B 17/05
[52] U.S. Cl. .................. 423/573 R; 423/221; 423/514
[58] Field of Search .................. 423/221, 514, 573 R; 55/229

[56] References Cited

U.S. PATENT DOCUMENTS

| 1,809,818 | 6/1931 | Bragg | 423/221 |
| 4,444,571 | 4/1984 | Matson | 55/54 |
| 4,579,727 | 4/1986 | Cronkright et al. | 423/221 |

FOREIGN PATENT DOCUMENTS 147609  11/1981  Japan .................. 55/54

OTHER PUBLICATIONS

Industrial Pollution–Control Handbook, Lund, ed., McGraw-Hill Book Co., 1971, pp. 7-4, 7.
Chemical Engineers' Handbook, 5th ed., Perry & Chilton, Eds., McGraw-Hill Book Co., 1973, pp. 18-67.
Gas Purification, 3rd ed., Kohl-Riesenfeld, Gulf Publishing Co., 1979, pp. 472-473.
Chemical Reaction Engineering, 2nd ed., Levenspiel, John Wiley & Sons, 1972, pp. 144-149.

Primary Examiner—John Doll
Assistant Examiner—Jeffrey Edwin Russel
Attorney, Agent, or Firm—David A. Rose

[57] ABSTRACT

The present invention is directed to a process for removing $H_2S$ from a gaseous stream, preferably a natural gas stream, which comprises forming a buffered aqueous $H_2S$ stream containing thiosulfate by contacting the gaseous stream with water containing a buffering agent and thiosulfate to remove the $H_2S$ from the other gases in the gaseous stream; introducing the buffered aqueous $H_2S$ stream into a reduction section under conditions wherein elemental sulphur is produced and removing an effluent stream from the reduction section; introducing the reduction section effluent into an oxidation section and contacting the effluent with air to react the oxygen in the air with the $H_2S$ in the effluent stream to produce predominantly thiosulfate, the volume of liquid fed to the oxidation section being in excess of the volume of gas fed, and removing an effluent stream from the oxidation section; separating the effluent stream from the oxidation section into a gas stream and a liquid stream; and treating separately the gas stream and the liquid stream to remove $H_2S$ from each stream and additionally to recover elemental sulfur from the liquid stream.

33 Claims, 1 Drawing Sheet

HYDROGEN SULFIDE REMOVAL AND SULFUR RECOVERY

FIELD OF THE INVENTION

The present invention is directed to a process for removing hydrogen sulfide ($H_2S$) from a gaseous stream and recovering elemental sulfur. More specifically, the process of the present invention is particularly suited to treat a gaseous stream which contains in excess of five percent of $H_2S$ and is available at high pressures. For example, natural gas in a sulfur environment may contain $H_2S$ at levels from one percent to ninety plus percent and may be at pressures of 55 atmospheres gauge (atg) or more. The $H_2S$ may be removed by the present invention to make the treated gas suitable for commercial use and, in addition, recover elemental sulfur.

BACKGROUND OF THE INVENTION

Hydrogen sulfide is often present in gas streams as a contaminant which prevents the use of the gas for domestic, commercial or industrial purposes. This problem is particularly severe in sour natural gas, which is often produced with $H_2S$ concentrations from one percent to as high as ninety percent. Over the years, many desulfurization processes have been developed in attempts to produce gas streams substantially free of hydrogen sulfide.

The commercial process most used in the recovery of hydrogen sulfide from an acid gas or sour gas stream and the production of elemental sulfur is the Claus process. The gas stream containing the acid gas is usually treated by solvent extraction or washing out the acid gases with any number of suitable solvents. The extraction or washing step produces a clean, treated gas stream and an acid gas stream. In the Claus process, the acid gas stream, mainly $H_2S$, and a controlled stoichiometric quantity of air are fed into a reaction furnace, where one-third of the $H_2S$ is burned to $SO_2$. The $H_2S$ and $SO_2$ react to form elemental sulfur thermally in the furnace. Also, elemental sulfur is catalytically formed in the reactors which follow the sulfur furnace according to the Clause reaction. One such commercial process is disclosed in *Hydrocarbon Processing*, April 1982, p. 109.

Another commercial process for the removal of hydrogen sulfide and the partial removal of organic sulfur compounds from natural and industrial gases is the Stretford process. The sour natural or industrial gas is counter-currently washed with an aqueous solution containing sodium carbonate, sodium vanadate and anthraquinone disulfonic acid (ADA). The hydrogen sulfide dissolves in the alkaline solution and is removed to any desired level. The hydrosulfide formed reacts with the 5-valent state vanadium and is oxidized to elemental sulfur. The aqueous solution for extracting the sour gases is regenerated by air blowing, and the reduced vanadium is restored to the 5-valent state through a mechanism involving oxygen transfer via the anthraquinone disulfonic acid. A specific example of this process is set forth in *Hydrocarbon Processing*, April 1982, p. 112.

Still another process for the conversion of $H_2S$ to elemental sulfur is the LO-CAT process. This process utilizes a dilute solution of iron held in solution by organic chelating agents. The aqueous solution containing the chelated iron serves as both a catalyst in the overall reaction of $H_2S$ with oxygen and takes part in the reactions by transfer of electrons. A more specific description of the process is set forth in *Hydrocarbon Processing*, April 1985, pp. 70 and 71.

U.S. Pat. No. 4,487,753 discloses a process for producing liquid elemental sulfur from a $CO_2$-rich gaseous stream containing $H_2S$. The gas is contacted with at least a stoichiometric amount of gaseous oxygen in the presence of liquid water with a fixed bed comprising a catalyst selected from the group consisting of a transition metal phthalocyanine compound dispersed on a support at a specified pH and temperature. The patent discloses a preferred support as activated carbon.

U.S. Pat. No. 4,579,727, issued on the application which included the present inventor, discloses a process for recovering elemental sulfur from a hydrogen sulfide containing gas stream by reacting the hydrogen sulfide in the gas stream with a buffered aqueous solution enriched in thiosulfate ions at an initial pH between about 4.5 and 6.5 for a residence time sufficient to react a portion of the hydrogen sulfide to elemental sulfur. The elemental sulfur is them removed and the solution now lean in thiosulfate ions is regenerated by the oxidation of the remaining hydrogen sulfide in the gas stream to deplete the hydrogen sulfide from the gas stream and to regenerate the liquid solution for recycling to the reduction zone.

In many respects, the method of U.S. Pat. No. 4,579,727 has advantages for the removal of $H_2S$ from gas streams and production of sulfur therefrom. However, this method is carried out in the presence of the entire volume of the gas being treated, requiring the use of large reaction vessels. This method requires the continuous addition of caustic because the process produces a substantial proportion of low value sulfates and the loss of the production of sulfur. Furthermore, with this process, the sulfur product may be contaminated with $H_2S$. Finally, if a nitrogen contamination of the gas stream is not allowed, it is necessary to use pure oxygen in the oxidation reaction.

SUMMARY OF THE INVENTION

The present invention is directed to a process for removing $H_2S$ from a gaseous stream, such as a natural gas stream, which comprises contacting the gaseous stream with water containing a buffering agent and thiosulfate ions to remove the $H_2S$ from the other gases in the gaseous stream; introducing the buffered aqueous stream containing $H_2S$ into a reduction section under conditions wherein elemental sulphur is produced by reaction of $H_2S$ and thiosulfate ions; introducing the reduction section effluent into an oxidation section and contacting it with air to react the oxygen in the air with most of the remaining $H_2S$ in the effluent stream in liquid phase to regenerate thiosulfate ions; separating the effluent stream from the oxidation section into a gas stream and a liquid stream; and treating separately the gas stream and the liquid stream to remove residual $H_2S$ from each stream and additionally to recover elemental sulfur from the liquid stream.

In a preferred embodiment of the invention, an absorber is used to absorb the $H_2S$ from the gas stream and produce a gas stream substantially free of $H_2S$ which, in addition, leads to very high $H_2S$ concentration in the liquid, especially when the absorption is carried out at high pressure and low temperature. This has the consequence of reduction of the reduction vessel size. This is further helped by the absence of any unnecessary gas associated with the aqueous stream containing the $H_2S$.

In the oxidation section of the process of the present invention, by keeping a discontinuous gaseous phase in a continuous liquid phase in the oxidation reactor, such as by using in-line mixers, a very small oxidation reactor results. By leaving a preferred, significant but small, amount of unconverted $H_2S$, sulfate by-product formation is considerably reduced. This further reduces the amount of alkali to be added, necessary for maintaining buffer activity within the desired pH range.

In the process of the present invention, effluent from the oxidation section may be recycled either to the reduction section or the oxidation section or to both. The purpose of the recycle is to maintain the desired level of buffering, to control the temperature, and to insure the maintenance of a continuous liquid phase in the oxidation section.

Finally, the separate work-up of the gas and liquid phase-out of the oxidation section allows preferred conditions for each of these steps, further reducing reactor sizes and sulfate formation.

As to the sulfur produced, separation of sulfur after practically all $H_2S$ has been removed, allows attainment of high quality sulfur, practically free of nocuous $H_2S$.

Separation of the $H_2S$ and maintaining the liquid away and separate from the original gas stream, permits the use of air as a source of oxygen, further reducing the cost of the process.

BRIEF DESCRIPTION OF THE DRAWINGS

The present invention will be more readily apparent from the appended drawings.

DESCRIPTION OF THE INVENTION

Figure 1:
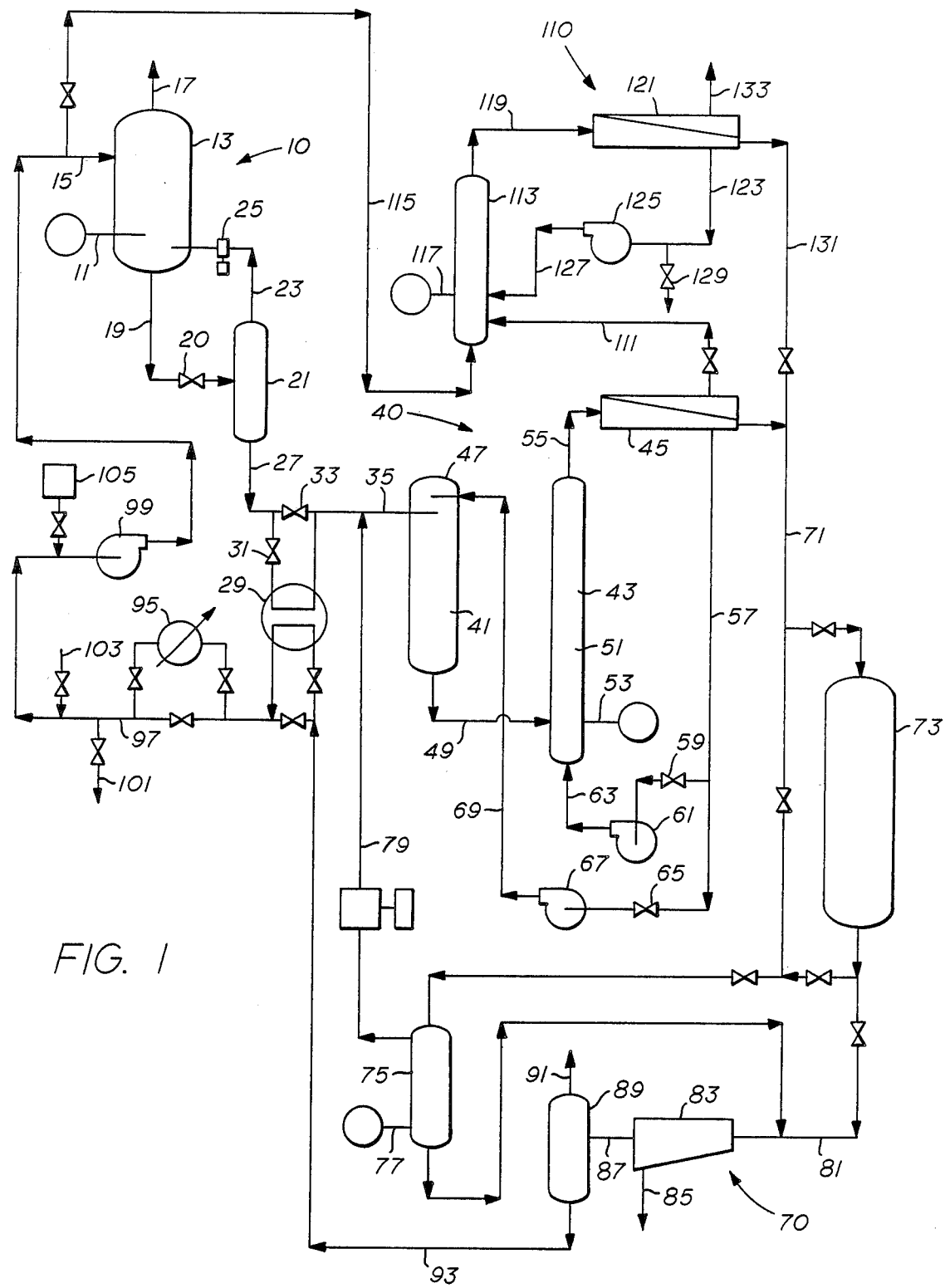
FIG. 1 diagramatically illustrates the process of the present invention.

According to the present invention, sour natural gas is contacted countercurrently in an absorber by an aqueous solution containing thiosulfate ions and a buffering agent. The aqueous solution absorbs the hydrogen sulfide ($H_2S$) present in the sour gas and the lean gas flows to a pipeline or the like for wellknown uses. The pressure of the aqueous effluent of the absorber containing the absorbed $H_2S$ may be reduced in a flash drum and the vaporized portion, comprising primarily methane and inorganics, is returned to the absorber. The liquid exiting the flash drum, containing the aqueous solution with the thiosulfate ions, the buffering agent and the absorbed $H_2S$, is heated by indirect and direct means, hereinafter described, to a temperature of about 120° to 160° C., for flow through a reduction reactor, wherein the thiosulfate ions and a portion of the $H_2S$ react to form elemental sulfur and water by the following reaction:

$$2H_2S + 2H^+ + S_2O_3^{--} \rightarrow 4S + 3H_2O \quad (1)$$

The aqueous effluent of the reduction reactor, lean in thiosulfate ions and containing the buffering agent, unreacted $H_2S$, elemental sulfur, flows to an oxidation reactor wherein most, but not all, of the remaining $H_2S$ is oxidized in the presence of oxygen regenerating thiosulfate ions by the following reaction:

$$2H_2S + 2O_2 \rightarrow S_2O_3^{--} + 2H^+ + H_2O \quad (2)$$

Some $H_2S$ is left unreacted so that reaction (2) above dominates and suppresses by-product sulfate formation according to the following reaction:

$$S_2O_3^{--} + 2O_2 + H_2O \rightarrow 2SO_4^{--} + 2H^+ \quad (3)$$

The effluent from the oxidation reactor flows to a separator drum wherein the vapor is separated from the liquid and flows to a tail gas unit for further treatment hereinafter described. As regards the liquid phase of the oxidation reactor effluent, a portion thereof can be recycled to the reduction reactor, another portion can be recycled to the oxidation reactor and the remaining portion is further treated to remove remaining traces of $H_2S$ and thereafter taken to a separator where the elemental sulfur is removed. After removal of the sulfur, water can be removed by vacuum flash. Following such removal, the remaining buffered aqueous liquid is recycled to the front end of the process and, more particularly, to the absorber for use as the absorbent for the removal of $H_2S$ from the sour natural gas. Before entering the absorber, the recycled aqueous stream exchanges heat with the reduction reactor feed to preheat such feed. Furthermore, the recycled aqueous stream is upgraded by purging a small amount thereof to prevent the buildup of impurities, and by adding, if desired, makeup water and buffering agent lost in the cycle.

Referring to FIG. 1, which is a specific embodiment illustrating the treatment of natural gas, the present invention can best be understood as having four essential processing units: a gas treating unit 10 whose basic function is to absorb the $H_2S$ from the other gases such as the methane, other hydrocarbons and other gases in natural gas in a buffered aqueous stream rich in thiosulfate ions; an $H_2S$ conversion unit 40 characterized by a reduction section wherein the $H_2S$ reacts with the thiosulfate ions to produce elemental sulfur and an oxidation section wherein most of the remaining $H_2S$ is reacted with oxygen from air to produce thiosulfate ions; a liquid treating stream unit 70 which provides for the removal of any residual $H_2S$ in the liquid stream effluent from the oxidation section and the recovery of elemental sulfur; and a gas treating unit 110 which provides for treatment and/or removal of $H_2S$ in the gas stream or tail gas from the oxidation section.

In the gas treating unit 10, an acid gas stream 11 is introduced into an absorber 13. The gas in gas stream 11 is contacted with a buffered aqueous stream rich in thiosulfate ions introduced by line 15 into absorber 13. The absorber 13 may be a conventional gas-liquid absorber having a plurality of trays sufficient in number to remove essentially all of the $H_2S$ from the gas stream, leaving a practically $H_2S$-free gas stream which exits by line 17. The absorber 13 may also be a packed bed or other device to remove the $H_2S$.

The buffered aqueous stream containing absorbed $H_2S$ is removed by line 19 and introduced through a pressure-reducing valve 20 into a flash tank 21. Due to the reduction in pressure in flash tank 21, methane and other gases are released and are removed by line 23. These gases are compressed by a compressor 25 and reintroduced into the bottom of absorber 13. The liquid is removed from the bottom of flash tank 21 by line 27 and may be heated in heat exchanger 29. Valves 31 and 33 are used to control the amount of heat exchange by the heat exchanger 29. The use of the heat exchanger 29, its size and the amount of heat exchanged are primarily a function of the total amount of $H_2S$ being treated in the system, as will be explained in more detail hereinafter.

The heated buffered aqueous stream is introduced by line 35 to reactor 47 in the reduction section 41. Reactor 47 is preferably a fixed-bed reactor or a packed tower. The reactor is designed in a manner well-known to those skilled in the art to provide sufficient residence time for the predominant reaction (2) above to occur. The conditions in the reduction section 41 are preferably maintained at about 120° C. to about 160° C. and at a pressure of between 10 and 40 atmospheres gauge. Under these conditions, the predominant reaction is between the absorbed $H_2S$ and thiosulfate ions to produce elemental sulfur and water. Also, under these conditions, the elemental sulfur exists essentially as a liquid in the aqueous stream. The effluent buffered aqueous stream from the reduction section 41, removed by line 49, contains the elemental sulfur, unreacted $H_2S$ and is now lean in thiosulfate ions. The amount of $H_2S$ in the effluent stream from the reduction section 41 when steady state conditions are reached is approximately one-half of the $H_2S$ introduced into the system.

The effluent from the reduction section 41 passes by line 49 to in-line mixer 51 in the oxidation section 43. An oxygen-containing gas, preferably air, is also fed by line 53 to the in-line mixer 51. Mixer 51 is preferably of the type that causes a large gas-liquid interface and, more specifically, a discontinuous gaseous phase in a continuous liquid phase for the co-current flowing phases. For instance, in-line mixer 51 may be of the Komax or the Koch-sulzer type which provide very efficient and effective mixing of the gas and liquid. A suitable in-line mixer type is disclosed in "Gas/Liquid Mass Transfer with Static Mixing Units" by F. Grosz-Röll, J. Battig and F. Moser, published at the Fourth European Conference on Mixing, Apr. 27–29, 1982, incorporated herein by reference. This type of mixer has the capability of producing a very large number of very small, uniform-size bubbles of gas in the continuous liquid phase. The volume of liquid in the mixer is greater than the volume of gas, preferably by a ratio of from about 1.05:1 to 3.0:1 or greater, so as to insure the maintenance of a discontinuous gaseous phase in a continuous liquid phase. This results in very fast mass transfer of the oxygen to react with the $H_2S$ according to reaction (2) above. The reaction, being exothermic, increases the temperature to an effluent temperature generally in the range of 135° C. to 170° C.

The amount of air introduced to the mixer 51 is a function of the amount of $H_2S$ present in the aqueous stream entering the mixer. According to this invention, it is not desired to react all of the $H_2S$, but to have $H_2S$ gas in the outlet 55 of the in-line mixer 51 at a partial pressure, measured at 150° C., of at least 0.005 atmosphere absolute (ata) and, preferably, a partial pressure of 0.07 ata. thus, the amount of oxygen fed to the mixer is limited to less than would be fed to achieve essentially complete oxidation of $H_2S$. It has been found, according to the present invention, that the presence of at least 0.005 ata partial pressure $H_2S$ minimizes the production of undesirable sulfates, because when less $H_2S$ is present, there is substantial oxidation of the thiosulfates ions, according to reaction (3) above.

The effluent stream from the oxidation section 43, which is the hottest point in the system with a temperature usually in the range of about 135° C. to 170° C., is removed from the outlet of the in-line mixer 51 by line 55 for introduction into a gas-liquid separator section 45, where it is separated into a gas stream and an aqueous stream. The aqueous stream is treated in liquid treating unit 70 and the gas stream is treated in tail gas unit 110, as hereinafter described.

A portion of the liquid phase is removed from the gas-liquid separator section 45 as a hot liquid stream by line 57 and is utilized for two recycles.

The first recycle is accomplished by passing a portion of this stream through valve 59 and pump 61 to line 63 for introduction into the oxidation section 43 or more specifically into the in-line mixer 51. This recycle enables the maintenance of the volume of liquid fed ($V_L$) to the in-line mixer 51 to be in excess of the gas fed ($V_G$). A preferred range of $V_L/V_G$ is 1.05 to 3. Hence, the amount of recycle is well within the skill of an engineer, recognizing that the amount of gas introduced in the effluent stream from the reduction section 41 while still maintaining at least the desired partial pressure of $H_2S$, as previously described, in the effluent from the oxidation section.

The second recycle is provided by passing the stream from line 57 through valve 65 and pump 67 for reintroduction by line 69 into the reduction section 41. This recycle has two purposes; first, to regulate the buffering capacity so that the pH in the reduction section 41 may be properly maintained and second to increase the temperature of the mixed streams into the reduction section to the desired temperature range.

According to the present invention both the gas stream or tail gas and the liquid stream from the separator 45 may be separately treated for removal of $H_2S$ to levels for disposal or recycle. The liquid stream is removed from the gas-liquid separator section 45 by line 71. Depending upon the amount of $H_2S$ which remains in the aqueous phase, a reduction vessel 73 may be utilized to provide sufficient residence time to permit further reaction of the $H_2S$ and thiosulfate to form additional elemental sulfur. Alternatively, if the $H_2S$ concentration is small, reduction vessel 73 may be bypassed. The by-pass stream or the effluent from the reduction vessel 73 is then passed through steam stripper 75. Steam is added by line 77 at the bottom of steam stripper 75 for countercurrent flow with the aqueous stream to remove any residual $H_2S$, producing a exit stream 79 which, after compression, if required, may be combined with the aqueous $H_2S$ stream introduced by line 35 to the reduction section 41. The essentially $H_2S$-free aqueous stream resulting from the steam stripping and containing the liquid sulfur is introduced by line 81 to a settler 83. In the settler 83, the liquid elemental sulphur is permitted to settle and is removed by line 85. The sulfur-free liquid from settler 83 is removed by line 87 and passed through a pressure reduction valve (not shown) to a flash vessel 89 at lower pressure. A gas phase is removed, which is the water of reaction or any water added to the system, by line 92 whereas the liquid phase is removed by line 93, the liquid stream containing thiosulfate and buffering agent. This liquid stream in line 93 is then passed through heat exchanger 29 for heating the incoming buffered aqueous $H_2S$ stream.

After the liquid stream is passed through heat exchanger 29, any undesired heat in the liquid (for adjustment of the temperature of the liquid to absorber 13) is removed by passing through a heat exchanger 95 to reduce the temperature to a preferred range of 10° C. to 60° C. and then passed through line 97 to a pump 99 for recycle to line 15 of absorber 13. In line 97 is a line 101 for taking off a bleed, primarily necessary for taking out the small amounts of sulfate which may be produced. Make-up water is introduced by line 103 and buffering solution introduced by buffering solution unit 105. Therefore, the necessary buffered aqueous stream containing the thiosulfate is ready for introduction by line 15 to the absorber 13.

The tail gas unit 110 may employ any of the commercial tail gas processes used in association with the Claus sulphur recovery units. For example, the Bevins sulfur recovery or catalytic incineration or CBA process, each of which are described in *Hydrocarbon Processing*, April 1982, pp. 114, 115 and 116, respectively. A preferred unit, however, is disclosed in FIG. 1.

The gas stream from the gas-liquid separator unit 45 is removed by line 111. The gas is introduced into a oxidizer unit 113. A portion of the recycled liquid stream from line 15 is also introduced by line 115 into the oxidizer 113. Air or oxygen-enriched air is introduced by line 117 to reactor with the hydrogen sulfide to produce thiosulfate. Because of the presence of thiosulfate, some elemental sulphur will also be produced. A stream is removed from the oxidizer 113 by line 119 and introduced into a gas-liquid separator 121. A portion of the liquid from separator 121 is cooled by a heat exchanger (not shown) and recycled by line 123 and pump 125 for reintroduction by line 127 to the oxidizer unit 113. In the recycle line 123 is a line 129 for purge of a portion of the liquid due to any build-up of any sulfates. The remaining portion of the liquid is removed by line 131 and may be combined or treated separately from the gas-liquid separator 45 for recovery of the sulphur as well as removal of any residual $H_2S$. The gas removed by line 133 has an $H_2S$ residual which meets specifications for disposal, after oxidation to $SO_2$, either by flaring or other means.

The buffering agent used in the process of this invention may be any of the well-known buffering agent which may be utilized to maintain a pH on the slightly acid side, such as between a pH of 4 and 7. As is well-known to those skilled in the art, such systems as the carbonate-bicarbonate or the phosphate buffering solutions may be utilized, and they are usually utilized in the form of the alkali metal salts, preferably sodium or potassium. Preferred buffering agents are the sodium carbonate and sodium bicarbonate. Preferably, the amount of buffering materials used is from about 0.5 to 2 gram moles per liter of total solution, to obtain a pH of the aqueous stream flowing into the reduction section between 4 and 7, preferably 4.5 to 5.5, for reaction of $H_2S$ with thiosulfate ions to produce sulfur.

The thiosulfate ions in the process will usually be in the form of the salt of the alkali metal of the buffering agent. It will be appreciated that the thiosulfate ions are the result of the oxidation reaction, and that actually a number of other sulfur anions result from this reaction, including polythiosulfates as well as monothiosulfates. The term "thiosulfate ion", as used herein, is therefore not intended to be limited to $S_2O_3^{--}$, but includes all such ions which may be produced and are reactive with $H_2S$.

It will also be appreciated that the amount of thiosulfate ions is controlled by the amount of oxygen introduced to the oxidation section, the amount of oxygen being based on the amount of $H_2S$ in the aqueous stream being fed to the oxidation section.

Referring to reactions (1) and (2) hereinabove, hydrogen ion consumption increases the pH, and in the oxidation reaction the pH is reduced again. The use of buffering materials aids in maintaining the pH within the desired range; however, the process of the present invention provides a means for maintaining the pH within the desired range in addition to the addition of buffering materials. More specifically, this is accomplished by the second recycle, through line 69, which provides a relatively large volume of buffered aqueous solution to the reduction section. According to this invention, sufficient recycle buffered solution is provided to reduce the $H_2S$ concentration fed to the reduction unit to no more than about 0.4 gram moles per liter. This allows the production of approximately 0.2 gram equivalent of hydrogen ions in the reduction section and the removal of approximately 0.2 gram equivalent in the oxidation section, while still maintaining the desired pH range. The amount of aqueous solution required to limit the $H_2S$ concentration to 0.4 gram moles per liter is a molar ratio of $H_2O$ to $H_2S$ of 139:1 (1000 gm/l/18=55.56 gram moles/1 $H_2O$ divided by 0.4 gram moles/2 $H_2S$=139). However, ratios as low as 80:1 may be used with good results, as may much higher ratios, e.g., 200:1 or more.

In order to insure that the temperature in the reduction section is in the desired range, preferably 120° C. to 160° C., it may be necessary to increase the flow through the second recycle at some concentrations of $H_2S$.

A significant aspect of the present invention is that when the $H_2S$ level in the inlet stream is greater than about five percent (5%) there is sufficient heat produced in the $H_2S$ conversion unit 40 for the operation of the process. A temperature of 130° C. to 170° C. at the exit of the separator 45 is desired to maintain the molten sulfur at low viscosity. Furthermore, it is desirable to maintain the temperature in the reduction section in the range of from 120° C. to 160° C. The heat of reactoin in the oxidation section provides the heat necessary to maintain these temperatures. At low $H_2S$ concentrations and when low recycle is required, less heat is generated. Hence, more heat is provided by heat exchanger 29 to obtain the desired temperature in the reduction section. At high $H_2S$ concentrations and when more recycle is required, more heat is generated and less heat exchange is needed.

In some instances at very high $H_2S$ levels, for example in excess of sixty percent (60%) $H_2S$, in the inlet gas so much heat is developed in the $H_2S$ conversion unit 40, that warm up from stream 35 to stream 71 can not take this heat away, so that a cool stream is desired in said unit 40. In those instances, a cooler or heat exchanger may be included in the line after valve 59 or in line 57 (not shown). As noted, the preferred position of the cooler is in the first recycle i.e., the recycle to the oxidation section 43. Cooling is preferably done with a liquid above 120° C. or under conditons not to form solid sulfur in the cooler or exchanger.

Under some circumstances, the recycle to the reduction section may provide sufficient liquid that the recycle to the oxidation section is not needed to provide a continuous liquid phase in the mixer 51. On the other hand, at very low $H_2S$ levels, the recycle to the reduction section may not be needed to maintain adequate buffering. Thus, the system has flexibility sufficient for efficient operation while treating gases with a wide range of $H_2S$ concentrations.

The system and method of this invention are particularly well adapted for treatment of natural gas streams at high pressures because, at such pressures, higher concentrations of $H_2S$ may be absorbed, allowing economy of scale in the equipment. However, the invention is also useful for treatment of lower pressure gases.

The present invention may also be further illustrated by the following specific examples:

EXAMPLE I

A feed of 5.6 million standard cubic feet per day (MMscfd) of natural gas, containing nine percent of $H_2S$, and at a pressure of 65 atg is fed to the process of the present invention. This feed is counter-currently contacted with an aqueous recycle stream containing 9500 pound moles per hour (MPH) of water, which is fed at about 40° C. and which is practically free of $H_2S$. The absorption is carried out in a multi-plate bubble tower. The treated natural gas exits from the tower and contains less than 5 ppm $H_2S$. The liquid stream, which now contains practically all the $H_2S$, is removed from the bubble tower and introduced into a flash vessel at 40 atg. From the flash vessel is removed a gas which is recompressed and fed back to the bottom of the absorption tower. The liquid stream from the flash vessel contains about 55.4 MPH of $H_2S$ and about 0.3 MPH of $CH_4$, together with small amounts of carbon dioxide, absorbed from the original natural gas stream. This liquid stream is heated in a heat exchanger, where heat exchange takes place against a recycled hot stream. The heated stream has an exit temperature of about 135° C. This liquid is then fed to the $H_2S$ conversion unit which comprises first a reduction vessel at a pressure of about 15 atg, without any recycle required. In the reduction vessel, plug flow is maintained by the presence of known internal structures. A suitable volume for the reduction vessel is about 350 cubic feet (cf).

The liquid effluent stream from the reduction vessel contains approximately 28 MPH of $H_2S$ in solution. This effluent stream is fed to an oxidation vessel where most of the $H_2S$ is oxidized by air. A total of about 133.3 MPH of compressed air, which is about 28 MPH of $O_2$ and about 105.3 MPH of $N_2$, is introduced into the oxidation vessel. The oxidation reactor is a series of Koch-type SMV static mixer elements as illustrated by the paper referred to hereinabove. The volume of the air is about 9,500 cubic feet per hour (cf/hr). This is at a temperature of 150° C. and 8 ata partial pressure. The total volume of liquid being fed is approximately 10,000 cf/hr of liquid, or about 35,000 MPH. To achieve this, a recycle of about 25,500 MPH of hot liquid from the gas-liquid separator at the exit of the oxidation vessel is added. The oxidation vessel is about 1'-7" in diameter and may be 20° long filled with in-line mixers to provide a gas dispersed in liquid, i.e. a discontinuous gaseous phase in a continuous liquid phase. The pressure at the inlet of the oxidizer is approximately 14 atg.

From the oxidation vessel is removed an effluent stream which is fed to a gas-liquid separator. The separator separates a gas strem which has an $H_2S$ partial pressure of 0.08 ata and a liquid stream. The level of $H_2S$ in the gas stream is accordingly about 1 MPH of $H_2S$.

The gas from the gas-liquid separator is fed to a tail gas recovery unit which includes an after-oxidation reactor. A cooled liquid recycle stream contains about 5,000 MPH of water which is from the gas-liquid separator following the after-oxidation reactor, is added to the after-oxidation reactor. Also added to the after-oxidation reactor, are about 10 MPH of air (2.1 MPH of $O_2$ and 7.9 MPH of $N_2$) and a cold recycle containing about 350 MPH of water (which will be described hereinafter below). The oxidatio in the tail gas unit is carried out at a temperature of about 80° C. The effluent from the after-oxidation reactor is introduced into a gas-liquid separator. The gas from the gas-liquid separator of the tail gas unit has an $H_2S$ content which is below 250 PPM on a total dry gas basis. This level is suitable for disposal or simple burning in any manner that will convert the very small amount of $H_2S$ into $SO_2$ which then can be disposed into the atmosphere. From the liquid stream from the gas-liquid separator in the tail gas unit, the aforementioned stream containing 5000 MPH of water is recycled, and the rest is then combined with the liquid from the gas-liquid separator from the $H_2S$ conversion unit.

A liquid stream from the gas-liquid separator in the $H_2S$ conversion unit provides the aforementioned recycle, containing about 25,500 MPH of water to the oxidation vessel. The remaining liquid stream is then combined with the liquid stream from the tail gas unit. These combined liquid streams contain about 9,900 MPH of water and approximately 0.4 MPH of $H_2S$. The combined liquid stream is fed to an after-reductor, which is about 900 cf, wherein the $H_2S$ is reduced to an amount of about 0.00135 MPH, sufficient for ultimate recycle to the cold absorber. Before the recycle, however, the liquid sulphur is separated in a liquid-liquid separator. The hot aqueous stream is flashed to remove water of reaction and is fed in exchange with the effluent from the cold absorber, maximizing the use of the heat within the system. After this heat exchange, the liquid is cooled to about 38° C. and recycled to the cold absorber. A part of this stream, containing 350 MPH of water, is that used in the tail gas recovery oxidation unit.

EXAMPLE II

A base feed of about 0.93 MMscfd of a natural gas stream containing 55% $H_2S$, 2% carbon dioxide and 43% $CH_4$, is introduced to an absorber at a pressure of 70 atg. The feed is counter-currently contacted in the absorber with an aqueous recycle stream containing 1500 MPH of water. The recycle stream is fed into the absorber at about 40° C. and is practically free of $H_2S$ but contains a buffer solution of sodium carbonate-sodium bicarbonate and thiosulfate. The exit gas from the absorber, which is a multi-plate bubble tower, contains less than 5 PPM of $H_2S$. The liquid removed from the absorber is passed through a pressure reduction valve and flashed in a flash vessel at about 45 atg. The gas from the flash vessel is compressed and fed back into the bottom of the absorption tower. The liquid from the flash vessel then contains about 56 MPH of $H_2S$, 0.3 MPH of $CH_4$ and about 0.5 MPH of carbon dioxide. Due to the heat of absorption, the temperature of the liquid is at about 47° C. The liquid is fed to a heat exchanger which allows some warm up, if heat loss occurs within the system, for temperature control of the reactor. A bypass of the heat exchanger is available since sufficient heat is available to the system.

The liquid stream is then fed to a reduction vessel in the $H_2S$ conversion unit. The $H_2S$ conversion unit consists of a reduction section, an oxidation section, a gas-liquid separation section and two recycles within the $H_2S$ conversion unit, each having a pump to recycle the relatively gas-free liquid from the gas-liquid separation section at the outlet of the oxidation section. The inlet liquid is introduced into the reduction vessel together with 5.15 times its volume of a recycle stream. Since the recycle liquid stream is at about 150° C. when mixed with the inlet liquid, the resulting liquid temperature is at about 132° C. The pressure in the reduction vessel is at about 20 atg. Packing is present in the reduction vessel to insure the desired plug flow and prevent undue amounts of back-mixing. The volume of the reduction vessel is about 300 cf which is sufficient to remove approximately 50% of the $H_2S$ by the reaction (1) hereinabove. In the reduction of the $H_2S$, there is developed about 28 lb. equivalent of alkali. The buffer in the solution is more than sufficient to counteract the effect of the production of this amount of alkali. From the foregoing, the stream contains 1,500 MPH of water plug 5.15 times 1,500 MPH for a total of 9,225 MPH of water. The amount of alkali in this amount of water translates to 0.17 g mol/l[28/(9225×18/1,000)]. Since a proper loading of buffer will handle at least 0.2 g mol/l (gram mole per liter) with a small resultant pH change, the recycle of 5.15 times is adequate for maintaining the proper pH within the reduction reactor. The molar ratio of $H_2O$ to $H_2S$ is thus 9225:56 or 165:1.

The liquid is then introduced to the oxidation unit which is operated at a pressure of 13 atg. The static mixing units of the Koch-type as set forth in Example I, provide a gas in liquid dispersion, i.e. a discontinuous gaseous phase in a continuous liquid phase, whereby the gaseous oxygen reacts with the $H_2S$ in the liquid phase with the reaction being limited by the oxygen mass transfer in the gas phase. To assure the gas in liquid dispersion, the volume of the liquid fed to the oxidation reactor is larger than the volume of gas fed to the reactor. Except for the start-up operation or during any swings in the amount of $H_2S$ being introduced into the system, the amount of $H_2S$ being fed to the oxidation reactor is about half that being introduced into the system or about 28 MPH, thus requiring that amount of oxygen. A total amount of about 133.3 mol MPH of air is introduced (28 MPH of oxygen and 105.3 MPH of nitrogen). The total volume of gas is about 9150 cf/hr. To achieve an excess volume of liquid, more than 31,732 MPH of water is necessary, and thus, a total flow of at least 22.22 times the fresh feed is needed. As set forth hereinabove 5.15 times the initial volume introduced into the $H_2S$ conversion unit or the reduction vessel has been taken in the first recycle, and thus, the second recycle will be at ratio of 16.07:1. The total liquid flow to the oxidation unit is approximately 9610 cf/hr (22.22×1,500×18/62.43). A small excess in the second recycle is taken not only to assure that the volume of liquid fed to the oxidation reactor is in excess of the gas volume fed, but also to assure that the temperature is at or close to 150° C. The air flow to the oxidation reactor is controlled to achieve a final $H_2S$ partial pressure of about 0.035 ata. At this level of $H_2S$ partial pressure, the oxidation beyond that of the $H_2S$ to thiosulfate is maintained so that very low sulfate make (less than 1% of hydrogen sulfide converted) is obtained in the oxidation reactor.

The liquid-gas mixture from the oxidation unit is then fed to a horizontal gas-liquid separator. The two recycles aforementioned are from the liquid phase of the gas-liquid separator.

Separate treatment of the gas stream and liquid stream to remove $H_2S$ and recover the sulphur takes place.

A stream is taken from the liquid phase in the gas-liquid separator. The stream removed is substantially equivalent in volume to the volume of the liquid stream coming from the flash vessel after the absorber. This liquid stream contains the sulphur product in liquid form. When the $H_2S$ gas phase has an outlet pressure of about 0.035 ata, the liquid phase contains about 0.03 MPH of $H_2S$, which must be removed prior to this stream being recycled as the recycle stream introduced to the absorber to absorb $H_2S$ down to the 5 ppm level. The liquid stream accordingly is stripped in a countercurrent stream of about 40 MPH of steam at about 150° C. The gaseous product containing the $H_2S$ and steam is cooled and recycled as a cold liquid containing the $H_2S$ into the $H_2S$ converter unit at the reduction vessel inlet. After removal of the dissolved $H_2S$, the liquid stream is passed to a horizontal settler to separate the liquid sulphur from the remainder of the hot liquid. Removed from the settler is a sulphur product at a rate of about 55.5 MPH, taken as monomolecular sulfur. The hot aqueous stream from the settler is reduced in pressure to permit evaportion of water, primarily to remove the water of reaction to maintain the water balance within the system. The liquid phase, still being hot, may be passed in heat exchange with the cold feed and, if necessary, cooled further before recycle to the absorber. A pump is used to introduce this recycle stream to the absorber at the pressure necessary to contact the higher pressure gas being washed with this aqueous stream.

The gas stream from the gas-liquid separator is treated in similar fashion as described in Example I.

EXAMPLE III

This example is to illustrate an embodiment wherein the concentration of $H_2S$ in a well is very high and the concentration of natural sulphur present in the well is so great that it is necessary to introduce a hot aqueous stream into the bottom of the well to avoid deposition of sulphur and clogging of the well.

Injected into a well is an aqueous hot recycle stream containing 5,157 MPH of water to absorb the major amount of $H_2S$ present in the well. The well produces at 500 atg. about 2 MMscfd of gas containing 90% $H_2S$, 9% $CH_4$, 1% carbon dioxide and also about 3,000 lbs. of sulphur per MMcf of gas. From the well, an effluent which contains about 176 MPH of $H_2S$ in solution in the aqueous stream is removed from the well. The temperature of the liquid stream is at about 138° C. and the sulphur is in the form of a liquid dispersion. When the recycle stream used as the hot water source contains thiosulfate, some of the $H_2S$ will react with the thiosulfate in the aqueous solution to produce more liquid sulphur.

From the well, exits also a gas phase which contains about 18 MPH of $CH_4$, 1 MPH of $CO_2$ $_{and\ about}$ 22 MPH of $H_2S$. This gas phase is separated from the liquid phase and the gas phase is washed countercurrently at about 70 atg with a recycle stream, it being the same source as the stream being placed in the well, containing 1,000 MPH of water at about 40° C. The liquid from this absorption is combined with the hot liquid recovered from the well. The combined streams are reduced in pressure to about 25 atg and introduced into a reduction vessel of about 400 cf together with a hot recycle stream from the $H_2S$ conversion unit containing 23,543 MPH of water. Since the total amount of $H_2S$ in the combined liquid streams is 198 MPH, the molar ratio of total $H_2O$ to $H_2S$ fed to the reduction vessel is 29,700:198 or about 150:1.

From the reduction vessel is taken a liquid stream which is fed to the oxidation unit. The oxidation reactor is a Koch-type in-line mixed as set forth in Example I. Also introduced to the oxidation unit is a practically gas-free recycle liquid from a gas-liquid separator at the exit of the oxidation unit. This recycled liquid contains approximately 110,000 MPH of water. The temperature of this stream has been reduced by heat exchange against a stream of about 118° C. to reduce the temperature of the recycle stream to approximately 144° C. Since the reaction in the oxidation unit is exothermic, considerable amounts of heat are produced and with the amount of $H_2S$ being at very high levels, the excess heat must be reduced to take the heat of reaction out of the oxidation unit. In addition, compressed air containing approximately 100 MPH of oxygen and 376 MPH of nitrogen is introduced to the oxidation unit. A suitable oxidation unit has a diameter of 3'-0" and a length of about 20', and is filled with in-lin mixers of the Koch-type. The pressure within the oxidation unit is about 14 atg which results in a gaseous volume at those conditions of about 30,000 cf/hr. A total liquid volume feed is about 40,000 cf/hr, thus insuring a gas in liquid dispersion within the oxidation unit. The outlet $H_2S$ partial pressure is 0.08 ata.

At the exit of the oxidation unit is a gas-liquid separator. From the separator is removed a liquid stream which is treated to remove residual $H_2S$ and recover the liquid sulphur. The stream contains about 0.2 MPH of $H_2S$. To treat this stream, it is fed to a 700 cf plug flow after-reducer vessel wherein the liquid leaves containing about less than 0.001 MPH of $H_2S$ or 0.1 part per million of $H_2S$. The sulphur is recovered in a separator vessel and the hot liquid flashed to remove the water of reaction and the liquid is then recycled.

The gas from the gas-liquid separator may be treated by any of the usual tail gas processes for $H_2S$. However, a suitable method is to combine the gas which has a partial pressure of $H_2S$ of about 0.03 ata with a liquid recycle which contains 560 MPH of water and treat in similar fashion as described in Example 1.

Besides the advantages which have been described in the general description of the present invention and illustrated by the examples, it should be recognized that:

1 - sulfur is recovered which is essentially $H_2S$-free;

2 - where the $H_2S$ can be separated from the remaining gses in the sour gas, the $H_2S$ is separated before reaction with the thiosulfate or oxygen containing gas to reduce the total volume of material pasing through the system;

3 - the size of the reduction reactor is minimized by maximizing the $H_2S$ concentration in the aqueous phase introduced into the reduction reactor;

4 - the size of the oxidizer is minimized by the use of in-line mixers by causing a large gas-liquid interface;

5 - the economics of air rather than pure oxygen are fully utilized; and

6 - the production of sulfates is minimized by conversion of $H_2S$ with oxygen in the oxygen-containing gas but only to a level where the gas phase and the liquid phase can be separately and easily treated to remove the $H_2S$ to disposal or recycle levels.

It is understood that while the process of the present invention has been illustrated by the removal of hydrogen sulfide from a gaseous stream, that the process is also directed to the recovery of elemental sulfur from various sources. In cleaning a gaseous stream, for example, a hydrocarbon stream such as natural gas, the treated gas is made suitable for commercial use. In this regard, when treating natural gas and an absorber is used, the carbon dioxide ($CO_2$) present may also be removed from the natural gas since most of the $CO_2$ is also removed from the natural gas in the absorber. The process of the present invention is also suitable for treating a hydrogen gas stream such as is produced in desulfurization processes used in a refinery. In these instances, the gas streams may be cleaned or treated by the removal of $H_2S$ to enhance the treated gas streams. The present invention may be used on treating a gas without the use of an absorber, such as treating essentially a carbon dioxide stream. Furthermore, the process is also useful to primarily recover the sulfur from a gaseous stream and the remaining gases may be considered of little interest since the sulfur is the primary product.

Although the invention is described with respect to specific embodiments and modifications, the details hereof are not to be construed as limitations except to the extent indicated in the following claims.

I claim:

1. A process for recovering elemental sulfur from a gaseous stream containing $H_2S$ which comprises:

contacting said gaseous stream with a buffered aqueous stream containing thiosulfate ions to form a buffered aqueous $H_2S$ stream containing thiosulfate ions and a product gas stream substantially free of $H_2S$ which is not further contacted with thiosulfate ions;

introducing said buffered aqueous $H_2S$ stream into a reduction sectionunder conditions whereby elemental sulfur is produced, and removing the aqueous effluent stream from said reduction section;

contacting said reduction section aqueous effluent in an oxidation section with oxygen to react $H_2S$ in said effluent to thiosulfate ions; and recovering elemental sulfur from the resulting stream from the oxidation section.

2. process according to claim 1, including maintaining a continuous liquid phase in the oxidation section.

3. A process according to claim 2 wherein said continuous liquid phase is maintained by a recycle of a portion of the effluent from the oxidation section.

4. A process according to claim 1 including recycling a portion of the effluent from the oxidation section to said reduction section.

5. A process according to claim 1 which further includes separating the effluent from the oxidation reaction into gas and liquid streams, and separately treating the gas and liquid streams to remove $H_2S$.

6. A process according to claim 5 wherein the separated liquid stream is treated by passing it through a reduction zone under conditions for production of elemental sulfur and removal of $H_2S$ by reaction of the $H_2S$ and thiosulfate ions.

7. A process according to claim 6 wherein the separated liquid stream is further treated by steam stripping.

8. A process according to claim 5 wherein the separated liquid stream is treated by steam stripping.

9. A process according to claim 5 wherein the separated gas stream is treated with air to react the residual $H_2S$ at lower temperatures than used in the oxidation section.

10. A process according to claim 4 wherein the molar ratio of $H_2O$ to $H_2S$ introduced to the reduction section is in excess of 80:1.

11. A process according to any of claims 1, 2, 3, 4 and 10 wherein the oxidation reaction is with oxygen in air.

12. A process for removing $H_2S$ from a gaseous stream which comprises:

contacting said gaseous stream with a buffered aqueous stream containing thiosulfate ions to form a buffered aqueous $H_2S$ stream and an essentially $H_2S$-free gas stream which is not further contacted with thiosulfate ions;

introducing said buffered aqueous $H_2S$ stream into a reduction section under conditions whereby elemental sulfur is produced and unreacted $H_2S$ remains, and removing an aqueous effluent stream containing said unreacted $H_2S$ from said reduction section;

introducing said reduction section effluent into an oxidation section, and contacting said effluent with air to react less than all of the $H_2S$ in said effluent to thiosulfate ions;

separating gas from liquid in the effluent stream from said oxidation section;

treating the separated gas stream to remove $H_2S$ from said gas stream;

treating the separated liquid stream to remove $H_2S$ from said liquid stream; and recovering elemental sulfur from the liquid stream.

13. A process according to claim 12 which further includes recycling the liquid stream, after removal of the sulphur, to the $H_2S$ containing gaseous stream.

14. A process according to claim 12 wherein further a recycle of a portion of said separated liquid is introduced to said oxidation section.

15. A process according to claim 12 wherein further a recycle of a portion of said separated liquid is introduced to said reduction section.

16. A process according to claim 12 wherein further a recycle of a portion of said separated liquid is introduced to said oxidation section and a recycle of a second portion of said separated liquid is introduced to said reduction section.

17. A process according to claim 12 wherein the partial pressure of $H_2S$ in the effluent stream from said oxidation section is at least 0.005 ata.

18. A process according to claim 12 wherein the partial pressure of $H_2S$ in the effluent stream from said oxidation section is at least 0.07 ata.

19. A process according to claim 13 wherein the temperature of the effluent stream from said oxidation section is within the range of about 130° C. to 170° C.

20. A process according to claim 13 wherein the temperature of the liquid stream in said reduction section is maintained at about 120° C. to about 160° C.

21. A process for removing $H_2S$ from a gaseous stream which comprises:

absorbing $H_2S$ from said gaseous stream in a buffered aqueous stream containing thiosulfate ions to form a buffered aqueous $H_2S$ stream and an essentially $H_2S$-free gas stream;

heating the buffered aqueous $H_2S$ stream to a temperature to enhance reaction of $H_2S$ and thiosulfate ions to produce elemental sulfur;

maintaining said aqueous stream in a reduction section for a period sufficient to react approximately one-half of the absorbed $H_2S$ with thiosulfate ions;

transferring the aqueous stream from the reduction section to an oxidation section;

introducing air to said oxidation section to provide oxygen for reacting less than all the remaining $H_2S$ to form thiosulfate ions;

separating the effluent from the oxidation section into a gas stream and a liquid stream;

recycling a portion of the liquid stream to maintain the pH in the reduction and oxidation sections in the range of 4.0 to 7.0;

separately treating the remaining liquid stream and the gas stream to remove $H_2S$;

recovering elemental sulfur from the $H_2S$-free liquid stream; and returning the sulfur-free liquid stream to the absorbing step.

22. A process according to claim 21 wherein said recycle is sufficient to maintain a continuous liquid phase in said oxidation section.

23. A process according to either of claims 21 and 22 wherein said recycle is introduced to said reduction section.

24. A process according to claim 23 and including a recycle to said oxidation section.

25. A process according to claim 21 and including maintaining the temperature of the separated liquid stream at a temperature of about 130° C. to 170° C.

26. A process according to claim 25 and including maintaining the temperature in the reduction zone at about 120° C. to 160° C.

27. A process according to either of claims 25 and 26 wherein the partial pressure of $H_2S$ in the effluent from the oxidation zone is at least 0.005 atmospheres absolute.

28. A process for converting $H_2S$ to elemental sulfur and thiosulfate ions which comprises:

introducing a buffered aqueous stream containing thiosulfate ions in the presence of $H_2S$ into a reduction section under conditions whereby elemental sulfur is produced, and removing an aqueous effluent stream containing unreacted $H_2S$ and said elemental sulfur from said reduction section;

introducing said aqueous reduction section effluent into an oxidation section cocurrently with an oxygen containing gas, said aqueous reduction section effluent and said oxygen-containing gas being the only reactants introducted into said oxidation section, to react less than all of the remaining $H_2S$ in said reduction section effluent to thiosulfate ions;

separating gas from liquid in the effluent stream from said oxidation section;

recycling a portion of said separated liquid from said oxidation section to maintain the volume of liquid in said oxidation section in excess of the volume of gas introduced to said section;

treating the separated gas stream to remove $H_2S$ from said gas stream; and treating the remaining portion of said liquid stream to remove $H_2S$ and further recovering elemental sulfur from said liquid stream.

29. A process according to claim 28 wherein said recycle is introduced to said oxidation section.

30. A process according to claim 28 wherein said recycle is introduced to said reduction section.

31. A process according to claim 28 wherein one recycle is introduced to said oxidation section and a second recycle is introduced to said reduction section.

32. A process according to claim 31 in which the recycle to the reduction section is sufficient to provide enough buffering that the pH will not vary from the range of 4.0 to 7.0 during the reduction and oxidation reactions.

33. A process according to claim 32 in which the molar ratio of $H_2O$ to $H_2S$ in the reduction section is at least about 125:1.

* * * * *